Figure 1:
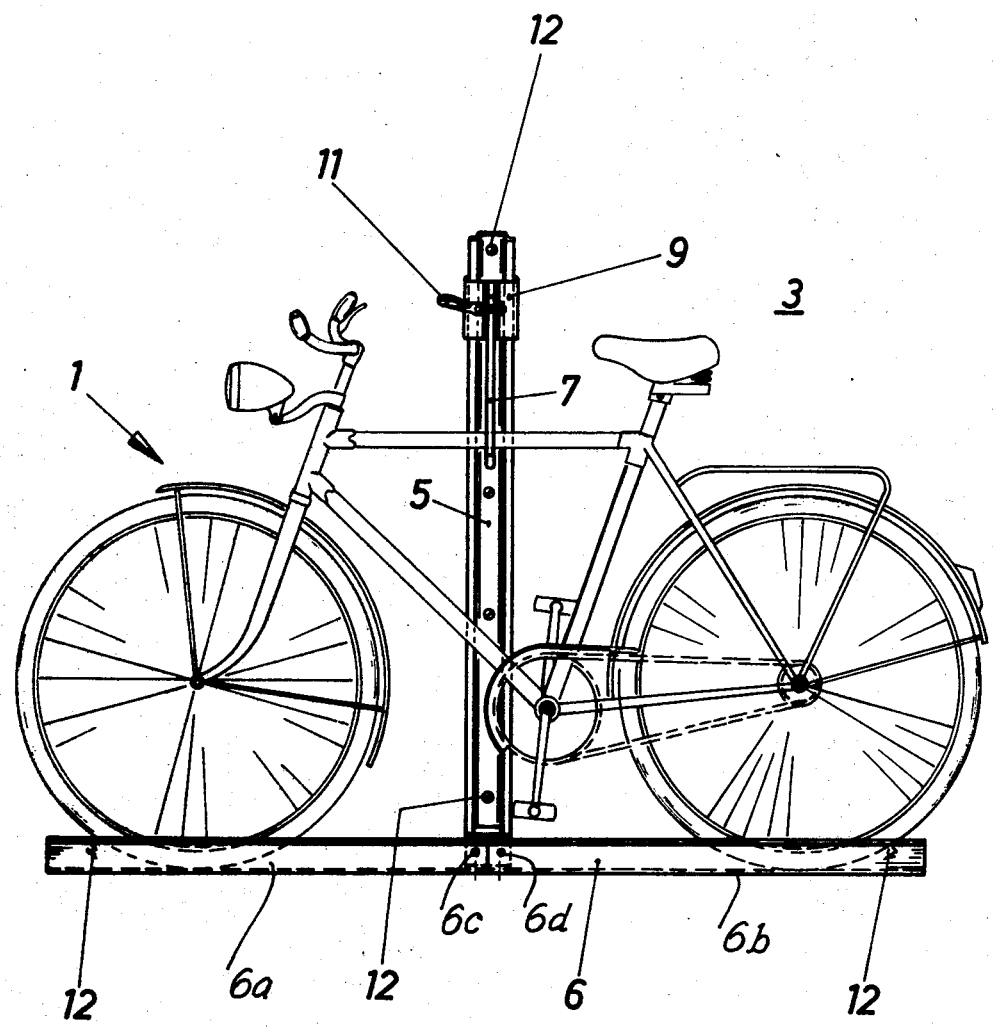

United States Patent [19]

Hugel

[11] 4,136,782
[45] Jan. 30, 1979

[54] DEVICE FOR STORING A BICYCLE IN A BUILDING SPACE

[76] Inventor: Kurt W. Hugel, Regulshausen J 11, 6580 Idar-Oberstein, Fed. Rep. of Germany

[21] Appl. No.: 852,615

[22] Filed: Nov. 18, 1977

[30] Foreign Application Priority Data

Nov. 22, 1976 [DE] Fed. Rep. of Germany ....... 2652992

[51] Int. Cl.² .............................................. A47F 7/04
[52] U.S. Cl. ......................................... 211/19; 211/21
[58] Field of Search ........................ 211/17, 18, 19, 20, 211/21, 22, 5; 70/235; 105/367, 504

[56] References Cited

U.S. PATENT DOCUMENTS

| 478,805 | 7/1892 | Munson | 211/22 |
|---|---|---|---|
| 621,819 | 3/1899 | Ivatt | 105/367 X |
| 803,196 | 10/1905 | Shearman | 211/20 |
| 3,901,421 | 8/1975 | Kalicki et al. | 211/17 X |
| 3,907,113 | 9/1975 | Kropelnitski | 211/19 |
| 3,964,611 | 6/1976 | Galen et al. | 70/235 X |

FOREIGN PATENT DOCUMENTS

| 552216 | 11/1956 | Italy | 211/17 |
|---|---|---|---|
| 18355 of | 1899 | United Kingdom | 211/18 |
| 2355 of | 1901 | United Kingdom | 211/22 |

*Primary Examiner*—Roy D. Frazier
*Assistant Examiner*—Robert W. Gibson, Jr.
*Attorney, Agent, or Firm*—Webb, Burden, Robinson & Webb

[57] ABSTRACT

A wall mounted rack for storing a bicycle or the like comprising a horizontal bracket mountable to said wall and being just wider than the tire of the bicycle to be stored, a rail perpendicular to said bracket mountable to said wall, a slide that can be adjusted along the vertical length of the rail, and a hook for suspending the bicycle with the wheels thereof placed upon the horizontal bracket hinged to said slide.

3 Claims, 2 Drawing Figures

DEVICE FOR STORING A BICYCLE IN A BUILDING SPACE

The invention relates to a device for storing a bicycle in a building space.

Bicycles in the form of cycles, mopeds, or the like are presently enjoying increasing popularity. However, if a multi-head family decides to buy bicycles, then at the same time the problem arises of making available a storage space for several bicycles. Bicycles are, on account of their construction, unfortunately bulky structures which take up a lot of space, so that often the buying of several bicycles is refrained from because the necessary storage space is lacking. The small space available in staircase wells, cellars and car garages is very soon filled up by a few bicycles stood there, so that further urgently needed bicycles can no longer be procured for reasons of space.

The problem underlying the invention is to obviate this disadvantage and to propose, for the space saving storage of bicycles, a device which considerably enlarges the storage capacity of existing building spaces for bicycles.

In accordance with the invention, this problem is solved by a wall bracket, dimensioned barely wider than the thickness of a tire. The bracket is fastened to a wall to support the two wheels of the bicycle at the same height. A perpendicular rail is fastened to the same wall by means of suitable (or its own) fastening means, so as to be adjustable in height. There is hinged to the rail a swivel hook for the suspension of the bicycle.

Advantageously the wall bracket consists of an upwardly open channel.

The wall bracket channel can advantageously be split in two parts connected in releasable manner to the lower end of the guide rail.

The swivel hook may be hinged to a slide which is guided on the guide rail and which has a releasable clamping device for the fastening of the slide to the guide rail at an adjustable height.

Figure 2:
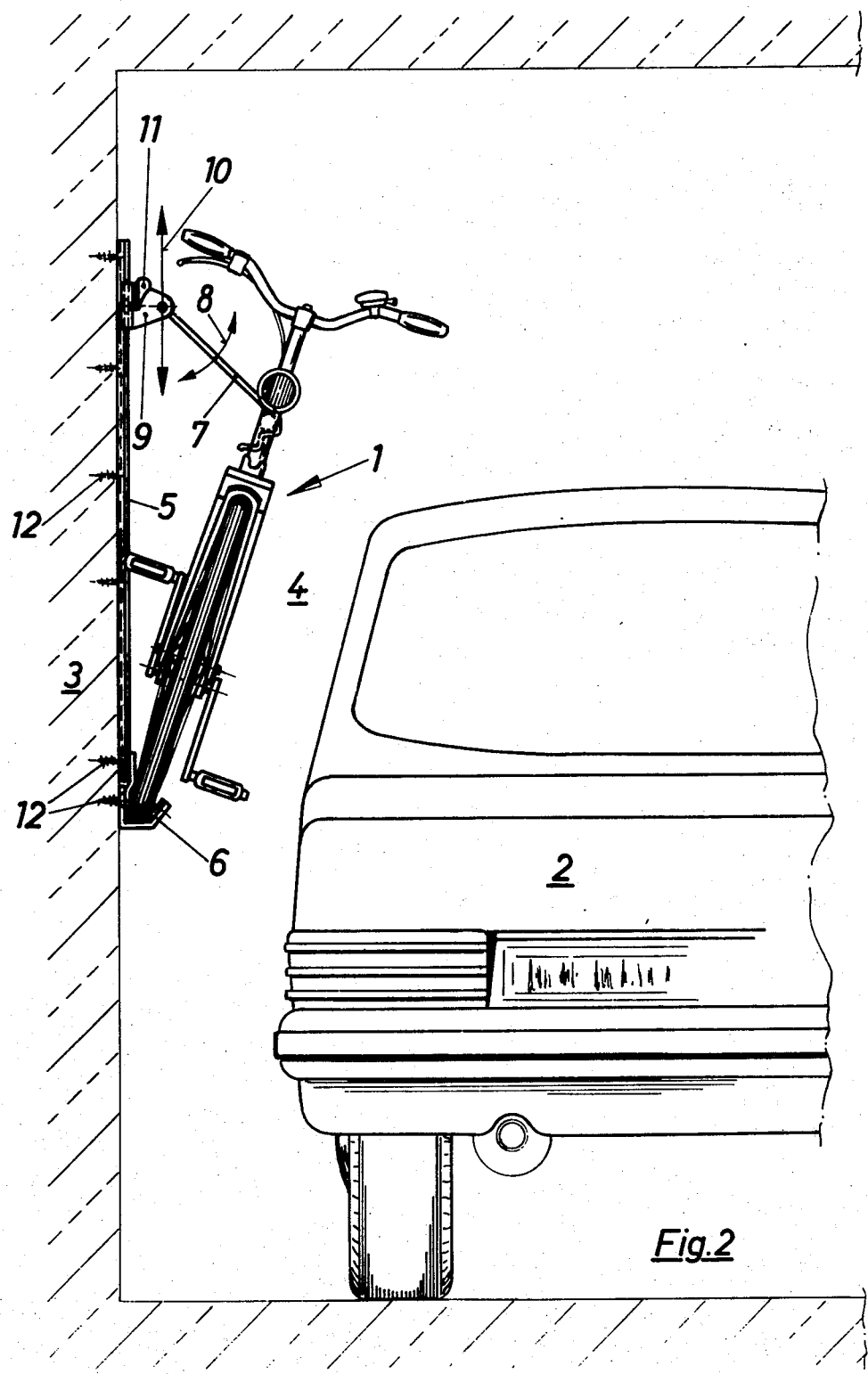

One embodiment of the invention will be explained in more detail hereinunder with reference to the drawings, in which:

FIG. 1 shows a front view of the device on a scale of about ten-fold reduction; and FIG. 2 shows a side view of the object in accordance with FIG. 1.

Shown in the drawings is the situation in a narrow car garage space. Precisely in the case of the frequently widespread ready-made garages the free space 4 of the garage 3 is dimensioned only slightly larger than the motor vehicle 2 standing therein. In the case of such tightly dimensioned prefabricated (or ready-made) garages it is thus not possible to stand one or more bicycles in addition to the motor vehicle against the wall of the garage.

This disadvantage is remedied in that fastened with the aid of the screws 12 to one wall at an appropriate height is a horizontal channel-shaped bracket 6 on which the two wheels of the bicycle 1 can be superimposed.

Since this bracket channel 6 projects only barely more than the thickness of a tire from the wall of the building space, the bicycle superimposed on the bracket channel must, on account of the pedal and the handle bar, which both knock against the wall, assume an oblique position. If, at the same time, the bracket channel 6 is fastened to the wall at a specific height position of, for example, about one meter above the ground, then a proportion of space of the relevant building space, which previously could not be made useful for this purpose, is made available and utilised for the storage of the bicycles.

Associated with the horizontal bracket rail 6 is a perpendicularly extending guide rail 5 which is also fastened to the same wall. Displaceable, so as to be adjustable in the direction of the double arrow 10, on this guide rail 5 is a slide 9 to which there is hinged a swivel hook 7 which is swingable in the direction of the double arrow 8 and which serves for the suspension of the bicycle 1. The slide 9 is equipped with a releasable clamping device 11, so that it is lockable on the guide rail 5 at the respectively necessary height.

According to a preferred embodiment as illustrated in FIGS. 1 and 2, the generally horizontal rail 6 is split into sections 6a and 6b each of which is hinged at 6c and 6d respectively to the vertical rail 5.

This simply designed device makes it possible that, for example, five bicycles can be accommodated in one prefabricated garage, without the given space conditions being constricted in any way. In this respect, three bicycles can be suspended in elevated manner from the one longitudinal wall of the prefabricated garage and one bicycle each can be so suspended from the end wall and the other longitudinal wall. The last-mentioned bicycle is fastened to the garage wall in the region of the engine of the motor vehicle when the motor vehicle has driven into the garage with the engine foremost. There thus remains open for the driver a sufficient possibility of access to the motor vehicle door. Without such a device it would not be possible to accommodate even one bicycle in a tightly dimensioned prefabricated garage.

The described advantageous space utilisation and the saving in space ensured in this respect at the same time is, of course, achievable also in other building spaces, for example in cellars and in the cellar space of staircase wells.

The advantageously three-part construction of the proposed device allows a convenient transportation from the store to the mounting location, where the device is fastened with the aid of a few screws 12 at the desired height position. Since the slide with the swivel hook is lockable at a different height position on the guide rail, the device can be adjusted and adapted to the most varied types and models of bicycles.

I claim:

1. A device for storing a bicycle in a building space comprising a generally horizontal wall bracket fastenable to a wall, said wall bracket comprising an upwardly open channel dimensioned barely wider than the thickness of a tire of said bicycle, said wall bracket arranged to support the two wheels of the bicycle, a generally vertical rail fastenable to the same wall extending upwardly from said horizontal wall bracket, and a swivel hook for the suspension of the bicycle interchangeably and adjustably secured along said vertical rail, said hook positionable to engage a portion of the bicycle frame when the wheels thereof are on the horizontal bracket such that the bicycle leans away from the wall and is inclined to the wall.

2. A device as claimed in claim 1, characterized in that the horizontal wall bracket channel is in two parts each hinged to the lower end of the vertical rail.

3. A device as claimed in claim 1, characterized in that the swivel hook is hinged to a slide which is guided on the vertical rail and which has a releasable clamping device for the fastening of the slide to the vertical rail at an adjustable height.

* * * * *